United States Patent
Ikeda (10) Patent No.: US 7,059,300 B2
(45) Date of Patent: Jun. 13, 2006

(54) IGNITION CONTROL APPARATUS FOR INTERNAL COMBUSTION ENGINE

(75) Inventor: Toru Ikeda, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 148 days.

(21) Appl. No.: 10/797,040

(22) Filed: Mar. 11, 2004

(65) Prior Publication Data

US 2005/0139194 A1  Jun. 30, 2005

(30) Foreign Application Priority Data

Dec. 24, 2003  (JP) .............................. 2003-428057

(51) Int. Cl.
*F02P 5/00* (2006.01)
(52) U.S. Cl. .............................. 123/406.55; 123/406.59
(58) Field of Classification Search ................................
123/406.55–406.59
See application file for complete search history.

(56) References Cited

U.S. PATENT DOCUMENTS 5,782,210 A * 7/1998 Venturoli et al. .......... 123/41 E
6,044,807 A * 4/2000 Hata ......................... 123/41 E
6,208,131 B1 * 3/2001 Cebis et al. ................. 324/165
6,405,687 B1 * 6/2002 Arakawa et al. .......... 123/41 E
6,668,799 B1 * 12/2003 Ohira .................... 123/406.58
6,784,658 B1 * 8/2004 Kawagoe et al. ........... 324/163
2004/0107950 A1 * 6/2004 Masaoka et al. ............ 123/631

FOREIGN PATENT DOCUMENTS

JP          07-229463 B2      12/2000

* cited by examiner

*Primary Examiner*—Henry C. Yuen
*Assistant Examiner*—Arnold Castro
(74) *Attorney, Agent, or Firm*—Sughrue Mion, PLLC

(57) ABSTRACT

An ignition control apparatus for an internal combustion engine for preventing ignition control upon occurrence of rotation reversal of the engine includes a rotation sensor (3) disposed in opposition to projections (11, 12) of a rotor (1), and an ignition timing control circuit (4) for fetching a rotation sensor signal (R) as a reference angular position signal to output a driving signal (P) to the ignition circuit (6). A retarded ignition control module (46) of the control circuit (4) measures a period of a specific interval of the sensor signal (R) while generating a driving signal (P) in dependence on the specific interval period. An arithmetic module (46) of the retarded ignition control module (46) sets an expectation period for accepting a succeeding sensor signal on the basis of the specific interval period to validate only the signal inputted during the expectation period.

8 Claims, 2 Drawing Sheets

IGNITION CONTROL APPARATUS FOR INTERNAL COMBUSTION ENGINE

BACKGROUND OF THE INVENTION

1. Field of the Invention

The present invention generally relates to an ignition control apparatus for an internal combustion engine installed on a motor vehicle such as a two-wheeled vehicle, a buggy car or the like. More particularly, the present invention is concerned with the ignition control apparatus for the internal combustion engine which apparatus is capable of automatically inhibiting ignition control upon occurrence of reverse rotation of the internal combustion engine operating in a low rotation speed range and which apparatus can be implemented inexpensively without incurring any appreciable increase of manufacturing cost.

2. Description of Related Art

In the conventional ignition control apparatus for the internal combustion engine known heretofore, a rotor driven rotationally by the internal combustion engine and having a projection formed on the outer periphery is employed in combination with a rotation sensor disposed in opposition to the projection of the rotor, wherein the rotation sensor is designed to generate a crank angle detection signal in the form of a pulse signal which includes a falling voltage waveform signal of negative (minus) polarity corresponding to a leading-edge portion of the projection of the rotor as viewed in the rotating direction thereof and a rising voltage waveform signal of positive (plus) polarity which corresponds to a trailing edge portion of the projection.

In general, the leading edge portion of the projection of the rotor is set at a crank angle reference position for a timer ignition control in an ordinary operation mode of the internal combustion engine, while the trailing edge portion of the projection is set at a crank angle reference position which corresponds to a fixed ignition timing for a retard ignition control in an operation range of low rotation speed.

The ignition control apparatus is designed to carry out the ignition control at the time point (timing) when the rising voltage waveform signal of positive polarity (corresponding to the trailing edge portion of the projection of the rotor) is generated in order to suppress or prevent variance of the ignition timing in the engine operation range of low rotation speed such as in the starting operation, idling operation or the like.

In addition, the ignition control apparatus is designed to detect the rotation speed of the engine on the basis of the inter-pulse period every time the falling voltage waveform signal of negative polarity (corresponding to the leading edge portion of the projection) is generated in order to control the ignition timing by setting a predicted ignition timing for the timer control with reference to the generation timing of the falling voltage waveform signal of negative polarity in the ordinary operation mode (engine operation in a high rotation speed range).

However, when the operation of the internal combustion engine is started or stopped, there may arise such situation that the crank shaft can not pass over the compression stroke, as a result of which reversal of the engine rotation takes place. In that case, the ignition control may unwantedly be carried out although it depends on the status of the rising voltage waveform signal of the rotation sensor, whereby the reverse rotation of the engine is promoted, giving rise to a serious problem.

The reason why the ignition control is performed when the engine rotation is reversed can be explained by the fact that when the rotation reversal takes place at a time point the rotation sensor is positioned, for example, in the vicinity of a mid portion of the projection, the leading edge portion of the projection of the rotor is detected again by the rotation sensor due to the reverse rotation, whereby the leading edge portion of the rotor projection is erroneously recognized as the trailing edge portion of the rotor projection. Furthermore, in this case, the rotor projection tends to move away from the rotation sensor (i.e., the gap between the projection and the rotation sensor tends to spread). Consequently, the rotation sensor signal assumes the same polarity as that of the rotation sensor signal generated in response to the trailing edge portion of the projection in the forward engine rotation mode. For this reason, recognition or detection of the reverse rotation of the engine is rendered impossible.

When the ignition control is executed upon reversal of the engine rotation, there may arise such situation that the reverse rotation of the engine is promoted or accelerated, bringing about a so-called kicking or kick-back phenomenon or event (i.e., reverse torque transmission to the starter apparatus), whereby a starter apparatus may unwantedly be damaged.

For coping with the problems mentioned above, it has already been proposed that a rotor of a magneto-generator is used in combination with the rotation sensor to detect a coil signal induced by magnets incorporated in the rotor in addition to the rotation sensor signal for detecting the forward or reverse rotation of the engine on the basis of the phases of the coil signal and the rotation sensor signal, respectively, to thereby validate the ignition signal in the forward rotation mode of the engine while invalidating the ignition signal in the reverse rotation mode (i.e., when the internal combustion engine rotates in the reverse or backward direction).

Furthermore, such an ignition control apparatus has also been proposed that the forward/reverse rotation state is discriminatively decided by detecting the phase of the rotation sensor signal generated when the rotation sensor traverses a plurality of projections disposed on the rotor and the phase of the coil signal of the magneto-generator in combination. For more particulars, reference may have to be made to Japanese Patent No. 3142436.

In that case, the retard ignition control for the low speed engine rotation in the starting operating mode is performed at the fixed ignition position without using the predicted ignition timing.

In the conventional ignition control apparatus for the internal combustion engine, the coil signal is detected by making use of the rotor of the magneto-generator for discriminatively determining or identifying the reverse rotation state, for which a coil signal detecting circuit is required in addition to the detection circuit for the rotation sensor signal, giving rise to a problem that the manufacturing cost is increased correspondingly. Besides, because a part of the electric power generated by the magneto-generator is consumed for the detection of the coil signal, the rated capacity intrinsic to the magneto-generator is thereby degraded, giving rise to an additional problem.

SUMMARY OF THE INVENTION

In the light of the state of the art described above, it is an object of the present invention to provide an ignition control apparatus for an internal combustion engine which is capable of avoiding the ignition control upon occurrence of reverse rotation of the internal combustion engine by discriminatively identifying the forward or reverse rotation of the engine on the basis of detection periods of a rotation sensor signal generated by a single rotation sensor disposed in opposition to a rotor integrally coupled to a crank shaft of the engine and having a plurality of projections formed on and along the outer periphery thereof while sparing the detection of the coil signal of the magneto-generator.

Further, another object of the present invention is to provide an ignition control apparatus for an internal combustion engine which is capable of performing a low-speed retard ignition control at a fixed ignition position without resorting to a timer ignition control based on a predicted ignition timing while evading the ignition control upon occurrence of the reverse rotation of the internal combustion engine in a low rotation speed range such as in an engine starting operation.

In view of the above and other objects which will become apparent as the description proceeds, there is provided according to a general aspect of the present invention an ignition control apparatus for an internal combustion engine, which apparatus includes an ignition circuit provided in correspondence to a cylinder of the internal combustion engine, a rotor rotatable in synchronism with rotation of a crank shaft of the internal combustion engine, a plurality of projections provided on and along an outer periphery of the rotor with a predetermined angular distance therebetween, a rotation sensor disposed in opposition to the plurality of projections, and an ignition timing control circuit for fetching as a reference angular position signal a rotation sensor signal generated by the rotation sensor every time the projection is detected, to thereby output a driving signal to the ignition circuit.

In the ignition control apparatus mentioned above, the ignition timing control circuit includes a timer ignition control means for an ordinary operation mode of the internal combustion engine, and a retarded ignition control means for an operation range in which rotation speed of the internal combustion engine is lower than the rotation speed in the ordinary operation mode.

The retarded ignition control means includes a period measuring means for measuring a period of a specific interval of the rotation sensor signal, and an arithmetic means for generating the driving signal in dependence on the period of the specific interval and validating a succeeding rotation sensor signal generated in succession to the specific interval.

The arithmetic means includes an expectation period setting means for setting on the basis of the period of the specific interval an expectation period during which the succeeding rotation sensor signal is expected to be generated and accepted (inputted) when the internal combustion engine is operating in a forward rotation mode, to thereby validate only the succeeding rotation sensor signal that is inputted during the expectation period.

By virtue of the arrangement of the ignition control apparatus for the internal combustion engine described above, the forward or reverse rotation of the internal combustion engine can be discriminatively identified by using only one rotation sensor disposed in opposition to the rotor having a plurality of projections formed on and along the outer periphery thereof, whereby the ignition control can positively be prevented upon occurrence of the reversed rotation status in the low rotation speed operation mode.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the views.

Embodiment 1

Figure 1:
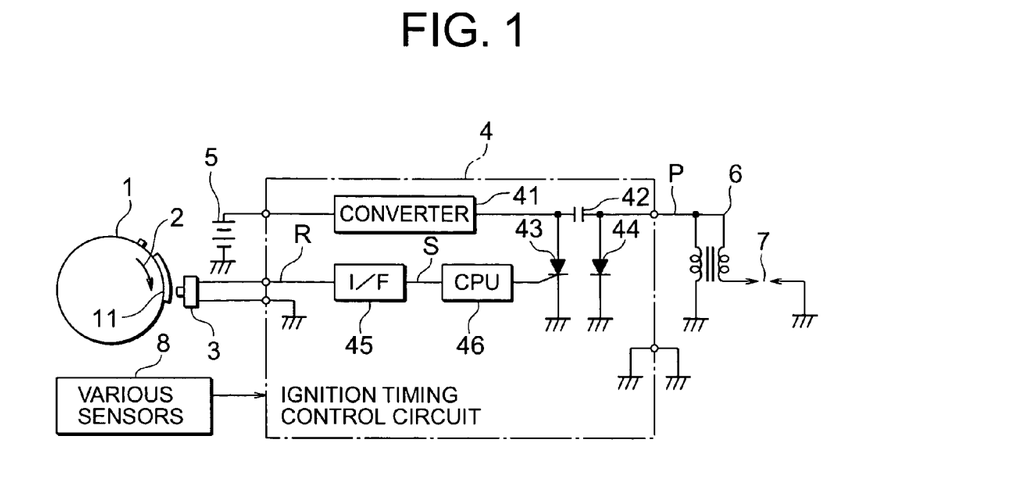
FIG. 1 is a block diagram showing schematically a structure of an ignition control apparatus for an internal combustion engine according to a first embodiment of the present invention.
Figure 2:
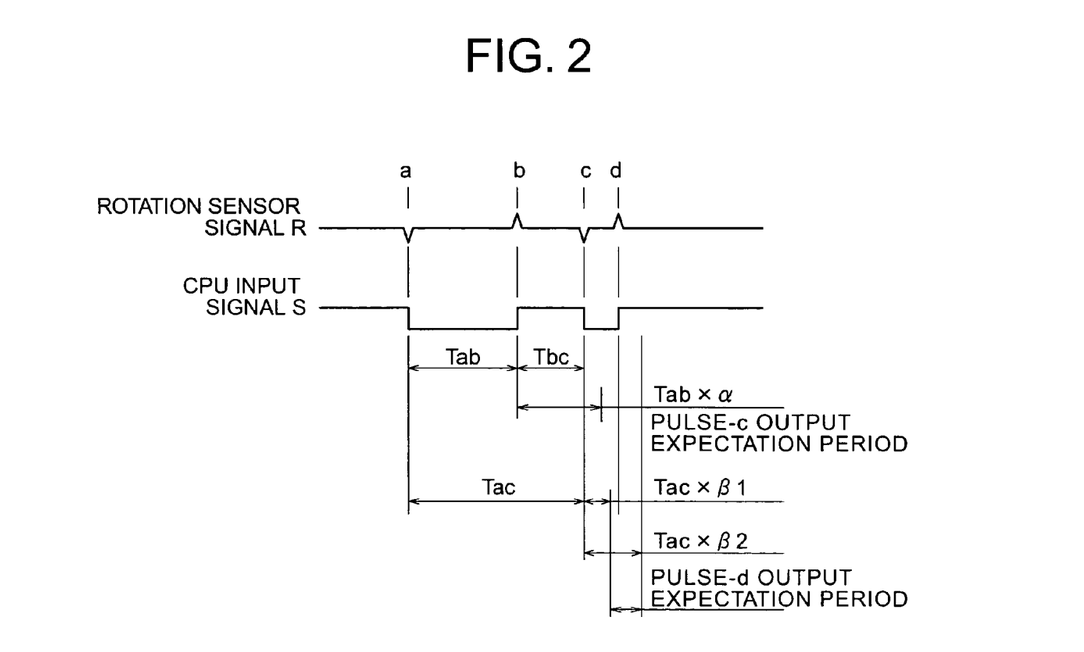
FIG. 2 is a timing chart showing waveforms of signals treated in the ignition control apparatus for the internal combustion engine according to the first embodiment of the invention.

FIG. 1 is a block diagram showing schematically a structure of the ignition control apparatus according to a first embodiment of the present invention. Further, FIG. 2 is a timing chart for illustrating the operation of the ignition control apparatus and shows waveforms of a rotation sensor signal R and a CPU input signal S handled in the ignition control apparatus.

Referring to FIG. 1, a rotor 1 is mounted on a crank shaft (not shown) of an internal combustion engine (not shown either) and rotationally driven in the direction indicated by an arrow 2 in synchronism with the rotation of the crank shaft.

Provided on and along the outer periphery of the rotor 1 are a plurality of projections (two projections 11 and 12 in the case of the ignition control apparatus now under consideration) which are sequentially arrayed with a predetermined angular distance therebetween in the direction indicated by the arrow 2. Each of the projections 11 and 12 has two end or edge portions, i.e., leading edge portions and trailing edge portions as viewed in the rotating direction of the rotor 1. Each of these end or edge portions is formed of a magnetic material.

More specifically, the projection 11 of a greater arcuate length disposed on the leading side as viewed in the rotating direction (forward rotating direction) 2 has the leading edge portion which corresponds to a first reference angular position (e.g. crank angle of 65° before the top dead center TDC of the internal combustion engine, hereinafter referred to as the B65° CA for short) and a trailing edge portion which corresponds to a second reference angular position (e.g. crank angle of 10° before the top dead center TDC, hereinafter also referred to as B10° CA for short) in correspondence to a plurality of cylinders of the internal combustion engine.

On the other hand, the projection 12 of a smaller arcuate length located on the succeeding or trailing side as viewed in the rotating direction 2 of the rotor 1 has a leading edge portion which corresponds to a third reference angular position (e.g. crank angle of 5° before the top dead center TDC, hereinafter referred to as B5° CA for short) and a trailing edge portion which corresponds to a fourth reference angular position (e.g. the top dead center TDC) in correspondence to the plurality of cylinders of the internal combustion engine.

A rotation sensor 3 is disposed in opposition to the projections 11 and 12 of the rotor 1 and constituted by an electromagnetic pickup which is so implemented as to generate a rotation sensor signal R having pulses which correspond to the crank angles of the individual cylinders every time the end or edge portions of the projections 11 and 12 are detected. More specifically, the rotation sensor 3 outputs a voltage pulse of negative (minus) polarity upon every detection of the leading edge portions of the projections 11 and 12, respectively, while the rotation sensor 3 outputs a voltage pulse of positive (plus) polarity every time the trailing edge portions of the projections 11 and 12, respectively, are detected.

The rotation sensor signal R outputted from the rotation sensor 3 is inputted to an ignition timing control circuit 4 which is constituted by in an ECU (Electronic Control Unit) together with output signals of other various types of sensors 8 which indicate operating state(s) of the internal combustion engine. Needless to say, the various sensors 8 mentioned above include a temperature sensor destined for detecting the temperature of cooling water of the internal combustion engine as the temperature information and others, as well known in the art.

The ignition timing control circuit 4 which is supplied with an electric power from a battery 5 operates to fetch the rotation sensor signal R as the reference angular position signal to arithmetically determine the ignition timing for the cylinders of the internal combustion engine in dependence on the rotation sensor signal R as well as the operating state of the engine to thereby output a driving signal P in correspondence to the ignition timing, the driving signal P being supplied to an ignition circuit (ignition coil) 6.

The ignition circuit (ignition coil) 6 is provided in association with the cylinders and composed of a primary winding which is electrically deenergized in response to the driving signal P and a secondary winding which is electrically connected to a spark plug 7. In the ignition circuit 6, a high voltage is outputted from the secondary winding upon electrical deenergization of the primary winding, whereby an electrical discharge spark is produced at the spark plug 7 of the cylinder under control to thereby ignite an air-fuel mixture charged in the combustion chamber defined within the relevant cylinder.

The ignition timing control circuit 4 is comprised of a converter 41 for converting the output voltage of the battery 5 to a source voltage of the ignition timing control circuit 4, a capacitor 42 for outputting the driving signal P on the basis of the output voltage of the converter 41, a thyristor 43 inserted between the input terminal of the capacitor 42 and the ground, a diode 44 inserted between the output terminal of the capacitor 42 and the ground, an interface (I/F) 45 for transforming the rotation sensor signal R into a CPU input signal S of a rectangular pulse waveform, and a CPU (Central Processing Unit) 46 which is designed or programmed to perform ON/OFF control of the thyristor 43 on the basis of the CPU input signal S.

The CPU 46 incorporated in the ignition timing control circuit 4 serves as a timer ignition control means in an ordinary operation mode (i.e., in a high-rotation-speed operation mode) of the internal combustion engine and as a retarded ignition control means operative in an operation range in which the engine rotation speed is lower than that in the ordinary operation mode (i.e., in a range of low rotation speed).

The retarded ignition control means incorporated in the CPU 46 includes a period measuring means and an arithmetic means, wherein the period measuring means is so programmed or designed as to measure the period of a specific interval of the rotation sensor signal R on the basis of the CPU input signal S.

On the other hand, the arithmetic means also incorporated in the retarded ignition control means is so programmed or designed as to generate a control signal (corresponding to the driving signal P) for the thyristor 43 in dependence on the period of the specific interval of the rotation sensor signal R to thereby validate a succeeding rotation sensor signal R which is generated in succession to the above-mentioned specific interval.

More specifically, the arithmetic means incorporates therein an expectation period setting means for setting on the basis of the period of the specific interval mentioned above an expectation period for accepting or receiving the succeeding rotation sensor signal which is expected to be generated in the forward rotation mode of the internal combustion engine (i.e., when the internal combustion engine is operating in the forward rotation mode) for thereby validating only the succeeding rotation sensor signal R inputted during the expectation period.

As mentioned previously, the first and second reference angles corresponding to the leading and trailing edge portions, respectively, of the projection 11 are so set as to correspond to sufficiently advanced timer reference angles (e.g. B65° CA and B10° CA), respectively, so that they can be used by the timer ignition control means.

Further, the third reference angle corresponding to the leading end or edge portion of the projection 12 is set on an advanced side of the top dead center TDC in the compression stroke of the cylinders (B5° CA) so that the third reference angle coincides with the ignition position in the idling operation mode of the internal combustion engine, whereas the fourth reference angle corresponding to the trailing end or edge portion of the projection 12 is set in the vicinity of the top dead center (TDC) in the compression stroke so as to coincide with the retarded ignition position set by the retarded ignition control means.

Referring to FIG. 2, the rotation sensor signal R generated in the forward rotation mode of the internal combustion engine contains pulses a, b, c and d generated sequentially with the polarities being alternately inverted. The generation timings at which the pulses a, b, c and d are generated correspond, respectively, to the first to fourth reference angles mentioned above.

More specifically, in the rotation sensor signal R, the pulse a corresponds to the leading edge portion of the projection 11, the pulse b corresponds to the trailing edge portion of the projection 11, the pulse c corresponds to the leading edge portion of the projection 12, and the pulse d corresponds to the trailing edge portion of the projection 12.

At this juncture, it should also be added that the time period intervening between the generation timing of the pulse a and that of the succeeding pulse a corresponds to one rotation (360°) of the crank shaft.

The CPU input signal S inputted to the CPU 46 from the interface 45 is of a rectangular waveform having falling edges corresponding, respectively, to the pulses a and c each of negative (minus) polarity and rising edges which correspond, respectively, to the pulses b and d each of positive (plus) polarity, respectively, so that the measurement of the period can be facilitated.

In this conjunction, the measurement time period between the individual edges of the CPU input signal S are defined as the periods Tab, Tac and Tbc of first to third specific intervals, respectively. More specifically, the measurement time period between the pulses a and b is defined as the period Tab of the first specific interval, the measurement time period between the pulses a and c is defined as the second period Tac of the second specific interval, and the measurement time period between the pulses c and d is defined as the period of the third specific interval.

As described previously, the first reference angle (B65° CA) represented by the pulse a indicates a reference position for setting at a timer a predicted ignition timing in the high speed rotation mode of the internal combustion engine, the third reference angle (B5° CA) represented by the pulse c indicates a fixed ignition position for the ignition control performed in the idling operation mode, and the fourth reference angle (TDC) represented by the pulse d indicates a low-speed-destined retarded ignition position for the ignition control performed only in the engine starting operation mode.

In the CPU 46, the period measuring means incorporated in the retarded ignition control means is so programmed or designed as to measure as the period of the specific interval at least one of the duration or period Tab of the first specific interval extending from the pulse a (corresponding to the first reference angle of B65° CA) to the pulse b (corresponding to the second reference angle of B10° CA), the period Tac of the second specific interval extending from the pulse a (corresponding to the first reference angle of B65° CA) to the pulse c (corresponding to the third reference angle of B5° CA) and the period Tbc of the third specific interval extending from the pulse b (corresponding to the second reference angle of B10° CA) to the pulse c (corresponding to the third reference angle of B5° CA)

Further, in the CPU 46, the expectation period setting means incorporated in the arithmetic means carries out the computation of Tab×α at the time point when the period Tab of the first specific interval is measured on the basis of the pulses a and b (i.e., at the time point when the pulse b is detected), to thereby set a pulse-c output expectation period (=Tab×α) as a maximum waiting period for accepting the pulse c to be detected in succession in the forward rotation mode of the internal combustion engine.

Incidentally, the coefficient α may be set rather arbitrarily in dependence on the specifications of the internal combustion engine, the specifications of hard/software required for the pulse detection, etc.

Similarly, the expectation period setting means carries out the computation of Tac×β1 and Tac×β2 at the time point when the period Tac of the second specific interval is measured on the basis of the pulses a and c (i.e., at the time point when the pulse c is detected), to thereby set a pulse-d output expectation period (=Tac×β1 to Tac×β2) as the waiting time range or period for accepting the pulse d to be detected in succession in the forward rotation mode of the internal combustion engine.

Incidentally, the relation existing between the coefficients β1 and β2 is that β1<β2.

Next, referring to FIG. 2, operation of the ignition timing control circuit 4 (FIG. 1) according to the first embodiment of the present invention will be described in detail.

The retarded ignition control means incorporated in the CPU 46 is so programmed or designed as to perform the ignition control for suppressing or preventing variance of the ignition timing at the time point (corresponding to the top dead center (or TDC) when the rising edge waveform signal corresponding to the trailing edge portion of the projection 12 is generated in an instable low-rotation-speed range (in the starting operation mode and the idling operation mode of the internal combustion engine) in which the engine rotation speed is low when compared with the rotation speed in the ordinary operation mode.

On the other hand, the CPU 46 incorporated in the ignition timing control circuit 4 serves to detect the period of the CPU input signal S (rotation sensor signal R) at every time point when the falling edge waveform signal corresponding to the leading edge portion of the projection 11 to thereby convert the detected period to the rotation speed of the engine, while the timer ignition control means incorporated in the CPU 46 sets the predicted ignition timing on the basis of the timing at which the falling edge waveform signal is generated at the maximum advanced angle to thereby execute the timer ignition timing control in the ordinary operation mode (in the high speed range) of the internal combustion engine.

The rotation sensor generates sequentially the rotation sensor signal R composed of the first to fourth pulses a to d. However, in the engine starting operation mode, the ignition timing control circuit 4 is incapable of discriminatively determining to which of the pulses a, b, c and d the detected rotation sensor signal R (CPU input signal S) corresponds.

Thus, in the CPU 46 incorporated in the ignition timing control circuit 4, the period measuring means constituting a part of the retarded ignition control means measures a first period T1 which extends from the generation timing of the first rotation sensor signal (not always corresponding to the pulse a) to the generation timing of the second rotation sensor signal (not always corresponding to the pulse b) and which does not necessarily coincides with the period Tab of the first specific interval as well as a second period T2 which extends from the generation timing of the first rotation sensor signal to the generation timing of the third rotation sensor signal (not always corresponding to the pulse c) and which does not always coincide with the period Tac of the second specific interval.

In that case, the expectation period setting means sets the first expectation period of T1×α (acceptance period) for accepting the third rotation signal on the basis of the first period T1 and waits for inputting of the third rotation sensor signal as generated.

In the case where the third rotation sensor signal is inputted during the first expectation period (T1×α), it is then decided that the generation timing of the third rotation sensor signal corresponds to the third reference angle, i.e., (the third rotation sensor signal corresponds to the pulse c) to thereby set the second expectation period (=Tac×β1~Tac×β2) for accepting the fourth rotation sensor signal (pulse d).

Further, at the time point when the third rotation sensor signal (pulse c) is recognized (validated), it is determined that the first and second rotation sensor signals correspond to the pulses a and b, respectively.

Subsequently, the arithmetic means performs the retarded ignition control in conformance with the generation timing of the fourth rotation sensor signal (pulse d) only when the fourth rotation sensor signal (pulse d) is inputted during the second expectation period.

At this juncture, let's assume that the reverse rotation state of the internal combustion engine has taken place during the period extending from the generation timing of the third rotation sensor signal (pulse c) to the generation timing of the fourth rotation sensor signal (pulse d), which in turn means that reversal of the engine rotation has occurred at the angular position immediately before the top dead center (TDC) in the compression stroke as viewed in the forward rotational direction of the engine. In that case, a remarkably extended time will be taken up to the time point at which the fourth rotation sensor signal is inputted when compared with the case where the engine is rotating in the forward direction.

For this reason, the fourth rotation sensor signal is not generated during the second expectation period (pulse-d output expectation period). In other words, the fourth rotation sensor signal generated in the course of the reverse rotation is positively prevented from being validated to be used for the ignition control.

Further, the arithmetic means serving as the retarded ignition control means regards the state in which the first period (corresponding to the period Tab) has reached or exceeded a predetermined threshold value (not shown) as the state in which the rotation speed has been lowered due to occurrence of the reverse rotation state and invalidates the fourth rotation sensor signal (corresponding to the pulse d) even when the fourth rotation sensor signal is generated during the second expectation period, to thereby inhibit the output of the driving signal P which corresponds to the fourth rotation sensor signal.

As is apparent from the foregoing, the CPU 46 incorporated in the ignition timing control circuit 4 is so programmed or designed as to arithmetically determine the pulse-c output expectation period (=Tab×α) after the measurement of the period Tab of the first specific interval while arithmetically determining the pulse-d output expectation period (=Tac×β1 Tac×β2) after the measurement of the period Tac of the second specific interval in the engine starting operation mode.

Only when the falling of the CPU input signal S (corresponding to the pulse c) is detected during the pulse-c output expectation period (=Tab×α), the pulse c is validated (i.e., accepted), and it is predicted that the pulse d will be detected during the pulse-d output expectation period (=Tac× β1~Tac×β2).

Subsequently, when the pulse d is detected during the pulse-d output expectation period, it is determined that the fourth reference angle (retard ignition control position) is normally inputted, whereon the retarded ignition control is carried out at a low rotation speed in the engine starting operation mode.

Thus, so far as the pulse a is firstly inputted to the CPU 46 in the engine starting operation mode, the ignition control can immediately be carried out in the stroke which succeeds immediately to the input of the pulse a.

However, in the state where the engine rotation speed is extremely low, there exists a high possibility that the rotation of the internal combustion engine may be reversed during the period extending from the input timing of the pulse a to that of the pulse d. Accordingly, execution of the ignition control based on the pulse d is inhibited by the fail-safe function. To say in another way, when the period or time span Tab of the first specific interval has reached or exceeded the predetermined threshold value, the pulse d is then invalidated to thereby inhibit the driving signal P from being outputted even when the pulse d has been inputted (accepted).

Further, in the case where the pulse a is firstly inputted to the CPU 46, decision as to the pulse c can be performed from the time point immediately after the start of the engine operation. Accordingly, the detection period intervening between, for example, the pulse c generated after the start of the engine operation and the succeeding pulse c may be regarded as being equivalent to one rotation of the crank shaft, whereby the rotation speed of the internal combustion engine can be arithmetically determined.

When the rotation speed of the internal combustion engine has reached or exceeded a predetermined rotation speed (e.g. in the range of 500 to 800 rpm) set in advance, the internal combustion engine makes transition to the idling state. In that case, in order to prevent the rotation of the engine from becoming unstable due to variance of the ignition timing, the ignition control is carried out at the fixed angular position (B5° A) every time the pulse c is detected (i.e., accepted).

In the idling mode such as mentioned above, the ignition control is executed only when the falling of the CPU input signal S (pulse c of the rotation sensor signal R) is detected within the pulse-c output expectation period (=Tab×α).

When the rotation speed of the internal combustion engine increases to enter the ignition timing advance control range (high-speed operation range), the CPU 46 fetches as the input thereto only the falling edge signal of the rotation sensor signal R (pulse a or c), whereon the predicted ignition control for the ordinary operation mode of the internal combustion engine is carried out by setting as the reference position for the timer control the falling edge timing (generation timing of the pulse a) of the CPU input signal S for which the longest period (295° CA) has been measured.

Figure 3:
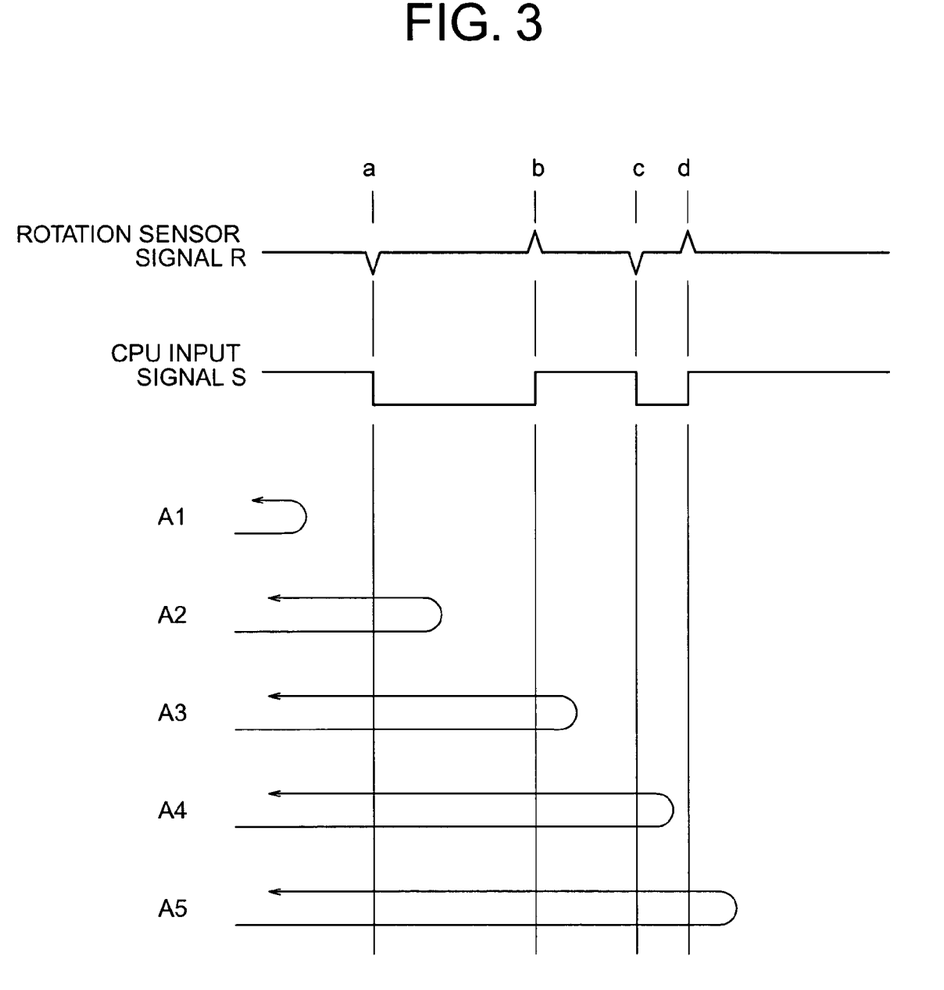
FIG. 3 is a view for illustrating, by way of example, ignition control inhibiting operations performed by the ignition control apparatus upon occurrence of reversal of rotation of the internal combustion engine.

Next, referring to FIG. 3, description will be directed to the operation of avoiding the ignition control upon occurrence of reversal of the engine rotation as carried out by the ignition control apparatus according to the first embodiment of the invention by taking as examples the cases or situations where the timings at which reversal of the engine rotation occurs differ from one another.

FIG. 3 is a view for graphically illustrating, by way of example only, five different rotating operations A1 to A5 at all the timings at which reversal of the engine rotation may take place and shows the individual rotation reversal timings (turns of arrows A1 to A5) in association with timing charts of the rotation sensor signal R and the CPU input signal S, respectively.

When the rotation of the internal combustion engine is reversed, the output polarity of the rotation sensor signal R is inverted as compared with the polarity when the engine rotates in the forward direction. As a consequence, the output polarity of the CPU input signal S is inverted as well. Thus, the CPU input signal S is inputted with the direction being turned while following backwardly the waveform generated in the forward rotation mode of the engine.

By way of example, when the reversal of the engine rotation takes place during the period between the pulses a and b, as in the case of the situation or example A2 shown in FIG. 3, the CPU input signal S turns the direction toward the pulse a. However, in that case, since the gap between the rotation sensor 3 and the projection 11 tends to spread, the pulse a detected upon reversal of the engine rotation assumes the same polarity (positive polarity) as the pulse b generated in the forward rotation mode (corresponding to the rising edge of the CPU input signal S).

However, with the ignition control apparatus according to the first embodiment of the invention, execution of the ignition control can be avoided in any case of the illustrated examples of rotation reversals A1 to A5 which may occur in the engine starting operation mode. This will be elucidated below.

Referring to FIG. 3, in the case of the example A1 of rotation reversal, it is assumed that the reversal of the rotation of the internal combustion engine occurs during a period of high level immediately before the rotation sensor 3 reaches the leading edge portion of the projection 11, that is to say, immediately before the falling edge waveform (corresponding to the pulse a) of the CPU input signal S is detected.

In this case, the ignition control is not executed because the CPU input signal S is not detected yet at this time point.

In the case of the example A2, it is assumed that the reversal of engine rotation takes place during the low-level period of the CPU input signal S corresponding to the intermediate portion of the projection 11 (i.e., between the pulses a and b).

In this case, the ignition control is not carried out because the rising edge waveform signal (corresponding to the pulse b) is not inputted during the period extending from the time point at which the falling edge waveform (corresponding to the pulse a) is inputted within the pulse-c output expectation period (=Tab×α).

In the case of the example A3, rotation reversal of the engine takes place during the high level period of the CPU input signal S which corresponds to the interval between the trailing edge portion of the projection 11 and the leading edge portion of the projection 12 (i.e., between the pulses b and c).

In this case, there exists a possibility that the pulse b generated in the course of the rotation reversal may erroneously be recognized as the pulse c generated intrinsically in the forward rotation mode. However, since the time taken for the pulse a to be inputted in succession to the pulse b is too long to fall within the pulse-d output expectation period (i.e., decision range in the forward rotation mode of Tac×β1∼Tac×β2) for the low-speed retard ignition control, the ignition control is not carried out.

In this conjunction, it should be added that in the operation range in which the engine rotation speed is not lower than the idling rotation speed, the rotation speed itself of the internal combustion engine is relatively high. For this reason, reversal of the engine rotation at the advanced position as in the case of the example A3 can not occur in reality.

Further, in the case of the example A4, it is assumed that the reversal of engine rotation occurs during a low-level period of the CPU input signal S which corresponds to the intermediate portion of the projection 12 (between the pulses c and d).

In this case, the rotation reversal takes place at an extremely low rotation speed in the vicinity of the top dead center TDC in the compression stroke. In this conjunction, it is however noted that the rotation speed of the engine becomes lower than the rotation speed in the forward rotation mode before the rotation reversal occurs. For this reason, the period Tab of the first specific interval (or the period Tbc of the third specific interval) is longer than the threshold value. Accordingly, even when the pulse c generated in the course of the reverse rotation is erroneously recognized or detected as the pulse d, the ignition control is not executed owing to the invalidation processing described previously.

Further, in the case of the example A5, it is assumed that reversal of rotation of the engine takes place during the high-level period of the CPU input signal S immediately after passing by the trailing edge portion of the projection 12 (after the input of the pulse d).

In this case, the reversal of the engine rotation takes place at a position succeeding to passing over the top dead center TDC in the compression stroke (i.e., immediately after the ignition control at the fixed portion). However, in actuality, such situation can never occur in the internal combustion engine. Accordingly, the rotation reversal of the example A5 can duly be regarded as being unrealistic. Thus, the ignition control is not executed.

As is apparent from the above, the ignition control is not executed in any case of the engine rotation reversals such as typified by the examples A1 to A5. Thus, occurrence of kicking or kick-back phenomenon can be positively evaded.

It is thus apparent that by measuring the specific intervals between the crank angles, as described in the foregoing, the pulse input timing can arithmetically be predicted for the rotation sensor signal R (CPU input signal S) to be inputted in succession to the specific interval. When the rotation sensor signal R is inputted during the expectation period, the rotation sensor signal R is accepted or received as the normal signal, whereon the transition to the ignition control is validated. On the contrary, unless the rotation sensor signal R is inputted during the expectation period, it is then determined that the internal combustion engine is in the stoppage or reverse rotation state. In that case, the signal inputted at the time point located outside of the expectation period is not accepted but invalidated. In this manner, it is possible to avoid positively the ignition control of the internal combustion engine in the reverse rotation state or in the state immediately preceding to the stoppage of the engine to thereby suppress or prevent occurrence of the so-called kicking phenomenon or event.

With the ignition control apparatus according to the present invention, forward and reverse rotations of the internal combustion engine can discriminatively be identified with only one rotation sensor 3, and the ignition at the moment of reversal of the engine rotation can be inhibited without fail.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described.

By way of example, in the foregoing description of the preferred embodiment of the invention, it has been mentioned that the expectation periods are preset with the values of the coefficients α, β1 and β2 being fixed. However, the present invention is not restricted thereto. The values of the coefficients mentioned above may variably be set in dependence on e.g. the temperature of the internal combustion engine (temperature of the cooling water) and the opening degree of the throttle valve by adopting a so-called map retrieval technology, etc.

To this end, a load sensor for detecting the load imposed on the internal combustion engine (sensor for detecting the engine temperature or the opening degree of the throttle valve) may be provided, while a variable predicted period setting means may be incorporated in the arithmetic means of the CPU 46 for shortening the expectation period as a function of increase of the load.

Similarly, the threshold value for determining lowering of the engine rotation speed which value is to be compared with the specific interval may variably be set in dependence on the temperature of the engine cooling water. In that case, a variable threshold value setting means may be incorporated in the arithmetic means of the CPU 46 to increase the threshold value in correspondence to the increase of the temperature (i.e., the temperature of the cooling water).

By virtue of the measures mentioned above, the reverse rotation state can discriminatively be identified with significantly enhanced reliability.

Further, although the arithmetic means is so designed as to inhibit the execution of the ignition control when the period Tab of the first specific interval reaches or exceeds a predetermined threshold (e.g. several milliseconds), the arithmetic means may be so designed as to inhibit the execution of the ignition control (output of the driving signal P) in response to the fourth rotation sensor signal (pulse d) in the case where the period Tbc of the third specific interval reaches or exceeds a predetermined threshold. In this case, the threshold value is set shorter than the threshold value to be compared with the period Tab of the first specific interval.

Furthermore, such arrangement may be adopted that when the ratio of the period Tbc of the third specific interval to the period Tab of the first specific interval is greater than a predetermined threshold (e.g. about "0.5"), output of the driving signal P corresponding to the fourth rotation sensor signal (pulse d) is inhibited. In this case, advantageous effect and action similar to those mentioned above can be ensured, needless to say.

Finally, it should be added that although the detailed description of the preferred embodiment has been made on the assumption that the internal combustion engine has a plurality of cylinders, it will be obvious for those skilled in the art that the concept underlying the present invention can equally be applied to the internal combustion engine of a single cylinder.

In the light of the above, all suitable modifications and equivalents may be resorted to, falling within the scope of the invention.

What is claimed is:

1. An ignition control apparatus for an internal combustion engine, comprising:

an ignition circuit provided in correspondence to a cylinder of said internal combustion engine;

a rotor rotatable in synchronism with rotation of a crank shaft of said internal combustion engine;

a plurality of projections provided on and along an outer periphery of said rotor with a predetermined angular distance therebetween;

a rotation sensor disposed in opposition to said plurality of projections; and an ignition timing control circuit for fetching as a reference angular position signal a rotation sensor signal generated by said rotation sensor every time said projection is detected, to thereby output a driving signal to said ignition circuit, wherein said ignition timing control circuit includes:

timer ignition control means for an ordinary operation mode of said internal combustion engine; and retarded ignition control means for an operation range in which rotation speed of said internal combustion engine is lower than the rotation speed in said ordinary operation mode, wherein said retarded ignition control means includes:

period measuring means for measuring a period of a specific interval of said rotation sensor signal; and arithmetic means for generating said driving signal in dependence on the period of said specific interval and validating a succeeding rotation sensor signal generated in succession to said specific interval, and wherein said arithmetic means includes:

expectation period setting means for setting on the basis of the period of said specific interval an expectation period during which said succeeding rotation sensor signal is expected to be generated and accepted when said internal combustion engine is operating in a forward rotation mode, to thereby validate only the succeeding rotation sensor signal that is inputted during said expectation period.

2. An ignition control apparatus for an internal combustion engine according to claim 1, said rotation sensor being constituted by an electromagnetic pickup, wherein said plurality of projections includes a first projection having both edge portions each formed of a magnetic material and corresponding to first and second reference angles, respectively, of said cylinder, and a second projection having both edge portions each formed of a magnetic material and corresponding to third and fourth reference angles, respectively, of said cylinder, said first and second reference angles are set at sufficiently advanced timer reference angles so as to be capable of being used by said timer ignition control means, said third reference angle is set at an angle advanced relative to a top dead center (TDC) in a compression stroke of said cylinder, said fourth reference angle is set at a position in the vicinity of the top dead center (TDC) in said compression stroke so as to define a retarded ignition position for said retarded ignition control means, and wherein said specific interval includes at least one specific interval selected from a group consisting of a first specific interval extending from said first reference angle to said second reference angle, a second specific interval extending from said first reference angle to said third reference angle, and a third specific interval extending from said second reference angle to said third reference angle.

3. An ignition control apparatus for an internal combustion engine according to claim 2, wherein said rotation sensor generates sequentially first to fourth rotation sensor signals, said period measuring means is so designed as to measure a first period extending from a generation timing of said first rotation sensor signal to a generation timing of said second rotation sensor signal as well as a second period extending from a generation timing of said first rotation sensor signal to a generation timing of said third rotation sensor signal, said expectation period setting means is so designed as to set a first expectation period for accepting said third rotation signal on the basis of said first period, while deciding that said generation timing of said third rotation sensor signal corresponds to said third reference angle when said third rotation sensor signal is inputted during said first expectation period, to thereby set a second expectation period for accepting said fourth rotation sensor signal, and wherein said arithmetic means is so designed as to perform the retarded ignition control in dependence on said generation timing of said fourth rotation sensor signal only when said fourth rotation sensor signal is inputted during said second expectation period.

4. An ignition control apparatus for an internal combustion engine according to claim 3, wherein said arithmetic means is so designed as to inhibit the output of said driving signal corresponding to said fourth rotation sensor signal when said first period has exceeded a predetermined threshold value inclusive.

5. An ignition control apparatus for an internal combustion engine according to claim 3, wherein said period measuring means is so designed as to measure a third period extending from a generation timing of said second rotation sensor signal to a generation timing of said third rotation sensor signal, and wherein said arithmetic means is so designed as to inhibit output of said driving signal in response to said fourth rotation sensor signal when said third period exceeds a predetermined threshold value inclusive.

6. An ignition control apparatus for an internal combustion engine according to claim 3, wherein said period measuring means is so designed as to measure a third period extending from a generation timing of said second rotation sensor signal to a generation timing of said third rotation sensor signal, and wherein said arithmetic means is so designed as to inhibit output of said driving signal in response to said fourth rotation sensor signal when a ratio of said third period to said first period exceeds a predetermined threshold value inclusive.

7. An ignition control apparatus for an internal combustion engine according to claim 4, further comprising:

a temperature sensor for detecting temperature of said internal combustion engine, wherein said arithmetic means includes a variable threshold value setting means for increasing said threshold value as a function of rising of said temperature.

8. An ignition control apparatus for an internal combustion engine according to claim 1, further comprising:

a load sensor for detecting a load of said internal combustion engine, wherein said arithmetic means includes a variable expectation period setting means for shortening said expectation period as a function of increasing of said load.

* * * * *